United States Patent

Pelka

[15] 3,638,102

[45] Jan. 25, 1972

[54] OVERLOAD PROTECTION CIRCUIT

[72] Inventor: Horst Pelka, Munich, Germany

[73] Assignee: Siemens Aktiengesellschaft, Berlin and Munich, Germany

[22] Filed: Aug. 26, 1970

[21] Appl. No.: 67,240

Related U.S. Application Data

[63] Continuation of Ser. No. 679,437, Oct. 31, 1967, abandoned.

[30] Foreign Application Priority Data

Nov. 4, 1966 Germany ............................S 106853

[52] U.S. Cl. ...........................323/9, 317/33 VR, 323/22 T, 323/38

[51] Int. Cl. ........................................................G05f 1/44

[58] Field of Search ....................323/4, 9, 22 T, 38; 317/22, 317/33 VR, 31

[56] References Cited

UNITED STATES PATENTS 3,339,114 8/1967 Kelley et al..........................323/22 T 3,426,265 2/1969 Till ..........................................323/9

OTHER PUBLICATIONS

Kepco Power Supply Handbook, pg. 8 relied upon, Copyright 1965

IBM Tech. Disclosure Bulletin, Vol. 3, No. 8, Jan. 1961, pp. 40, 41; " Overcurrent Protection and Regulator Control" by Mikonis, Jr.

*Primary Examiner*—Gerald Goldberg

*Attorney*—Birch, Swindler, McKie & Beckett

[57] ABSTRACT

An overload protection circuit employing a transistor circuit responsive to bipolar direct current signals to prevent damage to overloaded electrical circuits. The transistor circuit is responsive to instantaneous current amplitudes in the associated electrical circuit to be protected greater than a predetermined value, to limit the current to a safe value, to thereby prevent damage to various components, such as transistors, of the associated electrical circuit.

8 Claims, 1 Drawing Figure

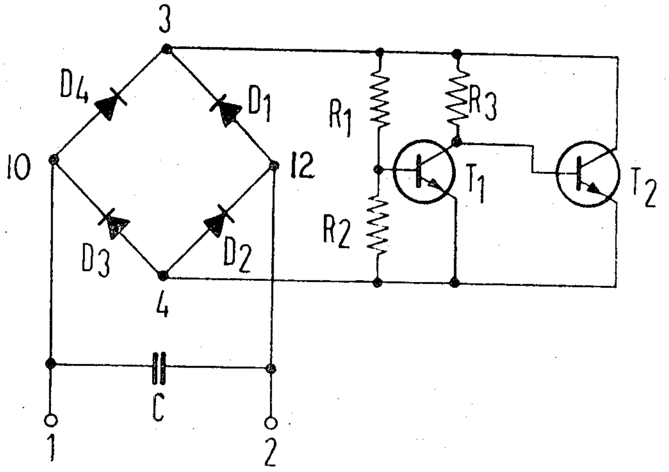
3
D4
D1
R1
R3
10
12
T1
T2
R2
D3
D2
4
C
1
2

OVERLOAD PROTECTION CIRCUIT

CROSS REFERENCE TO RELATED APPLICATION

This is a continuation of U.S. application Ser. No. 679,437 filed Oct. 31, 1967, now abandoned.

Applicant claims priority from corresponding German application Ser. No. S106,853, filed Nov. 4, 1966, in Germany.

BACKGROUND OF THE INVENTION

1. Field of the Invention

The invention is directed to an overload protection circuit, that comprises a transistor circuit responsive to bipolar direct current signals to limit the current flow through an associated electrical circuit when it is overloaded.

2. Description of the Prior Art

The prior art teaches the utilization of overload protection devices for various equipment such as electronic relays and power supply sources employing transistors. Normally, fast operating safety fuses or electromagnetic devices are employed to break the electrical circuit when it is overloaded. However, known safety fuses and electromagnetic devices respond relatively slowly to overload conditions, especially in circuits utilizing transistors that may be damaged before the safety fuse or electromagnetic device breaks the electrical connection thereto. Further, prior art overload devices usually must be reset or replaced after use.

The prior art also teaches a circuit employing first and second transistors wherein a voltage divider comprising first and second resistors is connected across first and second input terminals. The series connection of the first and second resistors is connected at the junction point of the two resistors to the base of the first transistor and a third resistor in connected between the first input terminal and the collector of the first transistor. The emitter of the first transistor is connected to the second input terminal, and the series connection of the third resistor and the emitter of the first transistor is connected to the base of the second transistor. The collector and emitter of the second transistor are respectively connected to the first and second input terminals.

The described circuit has a current-voltage characteristic comprising a negative portion and therefore has regenerative characteristics that may be employed to sustain oscillations. However, the prior art does not teach that the described circuit may be used as an overload protection circuit. Further, since alternating current signals cannot be applied between the first and second input terminals, without possible damage to the transistors, the described circuit cannot be responsive to bipolarity signal overload conditions.

SUMMARY OF THE INVENTION

These and other defects of prior art overload protection circuits are solved by the present invention which functions as a bipolarity signal overload protection circuit. The invention comprises a full wave rectifier connected between the circuit to be protected and the transistor arrangement comprising first and second transistors described above. Additionally, capacitive means are connected in parallel with the circuit to be protected.

The utilization of a full wave rectifier in combination with the described transistor circuit, provides that bipolar direct current signals for example telegraphy signals may be applied thereto in that a conductive path is provided in either direction. Further, the utilization of the capacitive means improves the response characteristics of the overload protection circuit. In order to reset the transistor circuit to the rest condition, a signal must be applied thereto that is opposite in polarity to the previously applied overload current, and of a time duration that enables the transistors to switch to their corresponding conditions.

BRIEF DESCRIPTION OF THE DRAWING

The FIGURE is an electrical schematic diagram of a preferred embodiment of the overload protection circuit developed in accordance with the invention.

DETAILED DESCRIPTION OF THE INVENTION

The FIGURE shows first and second transistors T1 and T2, respectively. Resistors R1 and R2 are connected in series between terminals 3 and 4, and the series connection of resistors R1 and R2 is connected to the base of transistor T1. Transistors T1 and T2 are shown as comprising NPN-transistors connected in common emitter configuration, but it is apparent that transistors of different conductivity may be employed with corresponding changes in the circuit.

Resistor R3 is connected between input terminal 3 and the collector of transistor T1, and the series connection of resistor R3 and the collector of transistor T1 is connected to the base of transistor T2. The collector and emitter of transistor T2 are connected to input terminals 3 and 4, respectively.

A full wave bridge rectifier comprising diodes D1–D4 is connected across terminals 1 and 2 which are connected to a circuit (not shown), which is to be protected against overloading, and between terminals 3 and 4 and the described transistor arrangement. The current flowing in the circuit to be protected (not shown) is thus applied to the rectifier through opposite diagonals 10 and 12, and the current from the bridge rectifier is applied to the overload protection circuit by the other pair of opposite diagonals 3 and 4. Capacitor C is connected in parallel with the circuit to be protected between terminals 1 and 2, which may also comprise the output terminals of the circuit to be protected.

The current flowing in the circuit to be protected is thereby applied in series to the overload protection circuit between diagonals 3 and 4. The bridge rectifier thus provides a current path for current flowing in either direction through transistor $T_2$. The transistor arrangement is thus responsive to the amplitude of the current flowing in the circuit to be protected and functions to prevent excessive current amplitudes that might damage components in the protected circuit especially semiconductor elements such as transistors. The terminals 1 and 2 may, for example, be placed between a transistor in the protected circuit and its current supply. This protected circuit may be the output circuit in a telegraph transmission system. In such circuits the output transistors are alternatively conductive or blocked so that the current path can change through the switching transistor.

The operation of the described overload protection circuit is as follows. If the amplitude of the current flowing in the circuit to be protected does not exceed a predetermined value, the transistor arrangement will not limit it. It is seen that diodes D1–D4 are polarized and connected to form a bridge rectifier, such that current signals flow from diagonal 3 to diagonal 4, through the transistor circuit, and that therefore diagonal 3 is positive with respect to diagonal 4.

The voltage divider comprising the series connection of resistors R1 and R2 is connected between diagonals 3 and 4, and the relative resistances of resistors R1 and R2 determine the bias potential applied to the base of NPN-transistor T1. The circuit components are selected such that when the amplitude of the current in the protected circuit does not exceed the predetermined value and is therefore indicative of normal load conditions, the rectified current applied to the voltage divider is not sufficiently positive to bias the base of transistor T1 to cause transistor T1 to be driven to conduction. However, under normal load conditions with transistor T1 being nonconductive, the base of transistor T2 is sufficiently positive with respect to its emitter, such that transistor T2 conducts. When transistor T2 is conductive its collector-emitter voltage is not sufficient to render transistor T1 conductive. When transistor T2 conducts, it provides a relatively low resistance series path between diagonals 3 and 4 for the current flowing in the protected circuit and therefore functions to maintain the level of the amplitude of the current of the protected circuit under normal load conditions. If a current of the opposite polarity should be applied to the bridge rectifier, transistor T2 will remain conductive, because the current path through it in effect does not change. This is possible due to the fact that the two other diodes in the bridge rectifier circuit have become conductive. It can be seen, therefore, that the bridge rectifier circuit is not used to rectify, but is used to maintain a current path through transistor T2 despite a change in polarity of the current applied to the bridge rectifier. The condition of the circuit described hereinabove is the "rest" wherein the circuit to be protected connected to terminals 1 and 2 is not in an overloaded condition. If, for example, a short circuit should occur or if the current in the circuit to be protected should exceed a specified maximum value, the protection circuit which is the subject of this invention will respond. When a current which exceeds the maximum permissible value is applied to the bridge rectifier circuit, there are results at the emitter-collector path of transistor T2 a larger voltage drop. This increased voltage drop at transistor T2 renders transistor T1 conductive. When transistor T1 has switched into the conductive state, the transistor T2 will be switched off. With current flow through transistor T2 stopped current from the protected circuit now proceeds to the conductive transistor T1. Resistors R3, R1 and R2 limit the current flowing thru transistor T1 to a fixed maximum value. Thus, the conductive transistor T1 will provide a current limiting path until such time as the current through the protected circuit drops to a value below the fixed maximum value. At his latter point, the transistor T2 becomes conductive again, and transistor T1 is turned off due to the fact that the voltage drop across the collector-emitter circuit of transistor T2 is not sufficiently high. Of course, the operating principles described hereinabove will hold true for either polarity of current applied to the bridge rectifier circuit for the reasons mentioned hereinabove with reference to the description of the bridge rectifier.

Thus, the circuit parameters are set to limit the current flowing in the protected circuit to a predetermined safe value, and will so function as long as an overload condition is present. When the polarity of the current in the protected circuit reverses in polarity, and therefore goes through a crossover value equal to zero (0) current amplitude, the rectified current applied to the transistor circuit between diagonals 3 and 4 will correspondingly have a crossover value equal to zero (0) current amplitude, and transistor T1 will be driven to the nonconducting state. Then as the current in the protected circuit continues to increase (relative to the zero (0) crossover value), transistor T2 will be driven to the conducting state, and the overload protection circuit will be reset to the rest condition. Then, if the overload condition consisted of only a temporary surge of current such that the current flowing in the protected circuit exceeded the predetermined value instantaneously, the current in the protected circuit is permitted to return to normal, because transistor T1 is blocked, and transistor T2 conducts. This also occurs, of course, if the overload condition such as a short circuit in the protected circuit is corrected.

To guaranty proper functioning of the overload protection circuit when alternating current signals are applied thereto having steep leading and/or trailing edges, as, for example, square or rectangular wave alternating current signals, capacitor C is connected between terminals 1 and 2. Capacitor C effectively functions to time average and thereby increase the time duration of steep leading and trailing edges to compensate for the switching response times of diodes D1 through D4 and thereby provide transistors T1 and T2 with sufficient time to respond to polarity reversals of the current in the protected circuit. Capacitor C thus increases the time available to transistors T1 and T2 to properly respond to the current conditions existing in the protected circuit, because capacitor C tends to maintain its charge for a predetermined time when a reversal in polarity of the alternating current signals in the protected circuit occurs, and thereby increases the relative time available to transistors T1 and T2 to respond thereto to reset the transistor circuit to the rest condition.

Of course, if the instantaneous value of the current in the protected circuit again exceeds the predetermined value, transistor T1 will again be driven to conduction, and transistor T2 will be blocked, thereby limiting the current in the protected circuit to a safe value. This also applies if an overload condition such as a short circuit occurs, and transistor T2 will remain blocked until the condition is corrected. Therefore it is seen that the overload protection circuit disclosed functions to reset itself, and is responsive to overload conditions causing excessive currents of either positive or negative polarity.

I claim:

1. An overload protection circuit for limiting the current through a circuit to be protected, comprising:
- a transistor circuit having first and second transistor stages,
- full wave rectifier means connecting said transistor circuit to said circuit to be protected,
- biasing means in said transistor circuit for blocking conduction of said first transistor stage and driving said second transistor stage into conduction when bipolar current signals coupled to said full wave rectifier means from said circuit to be protected are below a predetermined amplitude, and for blocking said second transistor stage of driving said first transistor state into conduction when bipolar signals coupled to said full wave rectifier means from said circuit to be protected exceed said predetermined amplitude, and
- load means in said first transistor stage for limiting the amount of current flowing in a circuit comprising said first transistor stage, said full wave rectifier means and said circuit to be protected to a value below said predetermined amplitude, when said first transistor stage is driven to conduction.

2. The overload protection circuit defined in claim 1 wherein said full wave rectifier means includes input terminals coupled to said circuit to be protected and output terminals coupled to said transistor circuit and wherein said first and second transistor stages each have conduction paths and said conduction paths of said first and second transistor stages are connected in parallel, the parallel combination of said conduction paths of said first and second transistor stages being connected across said output terminals of said full wave rectifier means.

3. The overload protection circuit defined in claim 2 wherein said first transistor stage further comprises an input circuit connected to said biasing means such that the voltage output of said biasing means controls the operation of said first transistor stage, and said second transistor stage further comprises an input circuit connected to the output circuit of said first transistor stage in such a manner that the operation of said first transistor stage controls the operation of said second transistor stage.

4. The overload protection circuit defined in claim 3 wherein the output terminals of said overload protection circuit are connected across said full wave rectifier means, said rectifier means further comprising a capacitor connected across the input terminals.

5. The overload protection circuit defined in claim 1 wherein said full wave rectifier means is constructed in the form of a bridge rectifier.

6. An overload protection circuit for limiting the current flowing in a circuit to be protected, comprising:
- first and second input terminals,
- voltage divider means connected across said first and second input terminals, said voltage divider means having a tap,
- first and second transistors, each of said transistors having a control electrode and a conduction path,
- means connecting said control electrode of said first transistor to said tap of said voltage divider means, said conduction path of said first transistor being connected across said input terminals, load means connected in series with said conduction path of said first transistor, means connecting said control electrode of said second transistor to said conduction path of said first transistor and said load means so that the voltage developed across said load means by current flow through said conduction path of said first transistor controls the operation of said second transistor, the conduction path of said second transistor being connected across the input terminals, and full wave rectifier means connected between said input terminals and said circuit to be protected, the relative resistance values of said voltage divider and said load means being selected so that said first transistor is blocked and said second transistor conducts when the current flowing in said circuit to be protected is below a predetermined amplitude, and said second transistor is blocked and said first transistor is conducting when said current is flowing in said circuit to be protected exceeds said predetermined amplitude.

7. The overload connections defined in claim 6 wherein said full wave rectifier means is constructed in the form of a bridge rectifier.

8. The overload connection circuit defined in claim 6 further comprising a capacitor connected across said full wave rectifier means and said circuit to be protected, said capacitor having a value such that the response time of said first and said second transistors to current signals having relatively steep leading edges in increased.

* * * * *